UNITED STATES PATENT OFFICE 2,589,955

AZO DYESTUFFS

Reinhard Neier and Walter Wehrli, Basel, Switzerland, assignors to Sandoz Limited, Basel, Switzerland, a Swiss firm No Drawing. Application February 14, 1949, Serial No. 76,415. In Switzerland February 18, 1948

4 Claims. (Cl. 260—207)

The present invention relates to new chromatable azo dyestuffs and to a process for their manufacture.

It has been found that new chromatable azo dyestuffs can be obtained by coupling diazotized 1-hydroxy-2-amino-4-nitro-6-acylaminobenzenes with compounds of the general formula

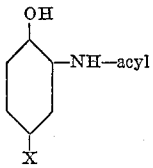

wherein X stands for an aliphatic radical containing one to six C-atoms, a cycloalkyl or a phenyl radical.

The chromatable azo dyestuffs obtained in this manner correspond to the general formula

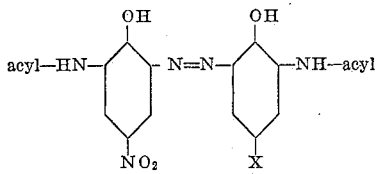

wherein X has the above meaning and the term "acyl" means radicals of acids like formic acid, acetic acid, halogenated acetic acids, alkoxyacetic acids, aryloxyacetic acids, propionic acid, butyric acid, oxalic acid, benzoic acid and its substitution products like nitrobenzoic acids, chlorobenzoic acids, toluic acids, acetylaminobenzoic acids, phthalic acids, sulfobenzoic acids and cyclohexyl carboxylic acid. The acylamino group may also be selected among the radicals consisting of carbamic-methylester, carbamic-ethylester, carbamic-propyl ester, carbamic-butylester, carbamic-amyl ester, carbamic-ethoxyethyl ester and others.

The acylamino derivatives used herein as starting compounds are generally new products and can be prepared in the same manner as described in German Patent 161 341 (Cassella, 1905) for 1-hydroxy-2-amino-4-nitro-6-acetylamino-benzene. According to our knowledge they have, until now, never been used for the synthesis of chromatable azo dyestuffs of the genus herein described.

According to the aforementioned German Patent 161,341, picramic acid is reacted in aqueous solution with acetic anhydride to produce N-acetylpicramic acid. Thereupon the nitro group, which is in the ortho-position to the hydroxy group, is reduced to the amino group with the aid of sodium sulfide, the conditions (pH, temperature and reaction period) being so established that no saponification of the acetamino group takes place. The substituent standing in p-position to the hydroxy group of the coupling component, according to this invention, can be an alkyl radical containing at most 6 C-atoms or a cycloalkyl radical, like cyclohexyl, or an aryl radical, like phenyl or a substituted phenyl. The alkyl radical present in the p-position to the hydroxy group may be for instance methyl, ethyl, n-propyl, isopropyl, n-butyl, isobutyl, secondary butyl, tertiary butyl, n-amyl, isoamyl, secondary amyl or tertiary amyl.

The coupling may be carried out in the usual manner in presence of an acid binding agent, such as bicarbonate, soda ash, sodium hydroxide, ammonia, lime milk, magnesia or pyridine. If desired at least two of the said acid binding agents can be combined together.

The dyestuffs obtained according to the present process dye wool and other animal fibres, when afterchromed, in full brown shades of excellent fastness properties. Most of them are especially suitable for dyeing wool according to the so-called metachrome process.

As compared with the dyestuffs described in U. S. Letters Patent 1,408,363 and obtained from diazotized picramic acid and 1-hydroxy-2-acetamino-4-methylbenzene and as compared with the dyestuffs described in the U. S. Letters Patent 2,229 200 and obtained from diazotized 1-hydroxy-2-amino-4-nitrobenzene and 1-hydroxy-2-acetamino-4-methylbenzene, the new dyestuffs possess darker brown shades and much better light fastness properties.

The following examples, without being limitative, illustrate the present invention, the parts being by weight.

*Example 1*

27.3 parts of 1-hydroxy-2-amino-4-nitro-6-benzoylaminobenzene, dissolved in water containing sodium hydroxide, are diazotized indirectly with 6.9 parts of sodium nitrite and 30 parts of hydrochloric acid and coupled in the presence of an acid binding agent, e. g. pyridine, with 16.5 parts of 1-hydroxy-2-acetylamino-4-methylbenzene. The isolated and dried dyestuff is a dark powder dyeing wool from an acid bath in red-brown shades, which become full brown on afterchroming. The dyestuff, which corresponds to the formula:

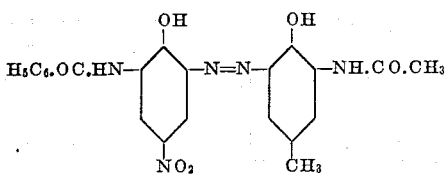

is especially suitable for dyeing wool according to the so-called one-bath chroming method.

Similar dyestuffs are obtained by replacing in this example 1-hydroxy-2-amino-4-nitro-6-benzoylaminobenzene by one of the following diazo compounds: 1-hydroxy-2-amino-4-nitro-6-(4'-nitrobenzoyl)-aminobenzene, 1-hydroxy-2-amino-4-nitro-6-propionylaminobenzene or 1-hydroxy-2-amino-4-nitro-6-butyryl-aminobenzene.

By replacing in this example the coupling compound, i. e. the 1-hydroxy-2-acetylamino-4-methylbenzene, by 1-hydroxy-2-formylamino-4-methylbenzene, a dyestuff with similar properties will be obtained.

Example 2

24.1 parts of 1-(2-hydroxy-3-amino-5-nitrophenyl-)-carbamic ethyl ester, dissolved in sodium hydroxide and water, are diazotized indirectly with 6.9 parts of sodium nitrite and 30 parts of hydrochloric acid and coupled in presence of an acid binding agent with 22.7 parts of 1-hydroxy-2-benzoyl-amino-4-methylbenzene. The isolated and dried dyestuff is a dark powder dyeing wool from an acid bath in red-brown shades, which become full brown on after-chroming. The dystuff is especially suitable for dyeing wool according to the co-called one-bath chroming method.

By using in this example, as diazo compound, 1-(2-hydroxy-3-amino-5-nitrophenyl)-carbamic methyl ester a dyestuff with similar properties will be obtained.

A similar dyestuff is also obtained by using in this example, as coupling component, 1-hydroxy-2-acetyl-amino-4-methylbenzene.

Example 3

21.1 parts of 1-hydroxy-2-amino-4-nitro-6-acetyl-aminobenzene are diazotized with 6.9 parts of sodium nitrite and 22 parts of hydrochloric acid and coupled in presence of an acid binding agent, like pyridine, with 22.7 parts of 1-hydroxy-2-benzoylamino-4-methylbenzene. The isolated and dried dyestuff which corresponds to the formula

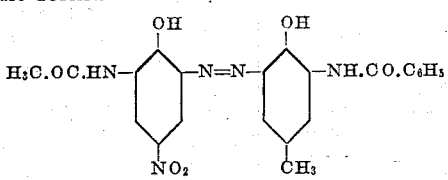

is a dark powder dyeing wool from an acid bath in red-brown shades, which become full brown on after-chroming. The dyestuff is especially suitable for dyeing wool according to the so-called one-bath chroming method.

By replacing in this example the 1-hydroxy-2-amino-4-nitro-6-acetylaminobenzene by 1-hydroxy-2-amino-4-nitro-6-chloro-acetylaminobenzene or by 1-hydroxy-2-amino-4-nitro-6-methoxy-acetylaminobenzene dyestuffs with similar properties will be obtained.

Instead of the coupling component used in this example, there can also be used 1-hydroxy-2-acetylamino-4-methylbenzene, 1-hydroxy-2-propionylamino-4-methylbenzene, 1-hydroxy-2-butylamino-4-methylbenzene, 1-hydroxy-2-acetylamino-4-phenylbenzene, 1-hydroxy-2-(4'-methylbenzoyl)-amino-4-methylbenzene, 1-hydroxy-2-(4'-acetylaminobenzoyl)-amino-4-methylbenzene, or the phthalamic derivative obtainable from 1-hydroxy-2-amino-4-methylbenzene and phthalic acid anhydride. Dyestuffs of similar or equivalent properties are thus obtained.

Example 4

21.1 parts of 1-hydroxy-2-amino-4-nitro-6-acetylaminobenzene are diazotized with 6.9 parts of sodium nitrite and 22 parts of hydrochloric acid and coupled in presence of pyridine with 22.1 parts of 1-hydroxy-2-acetylamino-4-tert.-amylbenzene. The isolated and dried dyestuff is a dark powder dyeing wool from an acid bath in red-brown shades, which become full brown on after-chroming. The dyestuff which corresponds to the formula:

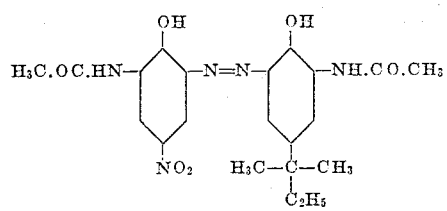

is especially suitable for dyeing wool according to the so-called one-bath chroming method.

Instead of the coupling component used in this example, one may use 1-hydroxy-2-acetylamino-4-ethylbenzene, 1-hydroxy-2-acetylamino-4-propylbenzene, 1-hydroxy-2-acetylamino-4-tert-butylbenzene, 1-hydroxy-2-acetylamino-4-cyclohexylbenzene, whereby similar dyestuffs will be obtained.

What we claim is:

1. The monoazo dyestuffs of the general formula

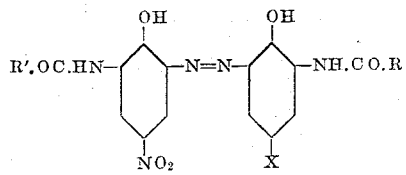

wherein X represents a member selected from the group consisting of alkyl radicals containing 1 to 6 C-atoms, cycloalkyl and phenyl radicals and wherein each of R and R' stands for a member selected from the group consisting of hydrogen and lower alkyl, lower alkoxy and mononuclear aryl radicals.

2. The monoazo dyestuff of the formula

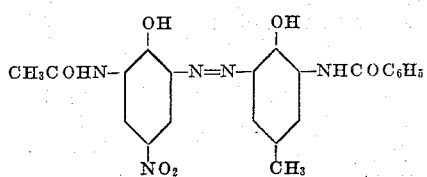

3. The monoazo dyestuff of the formula
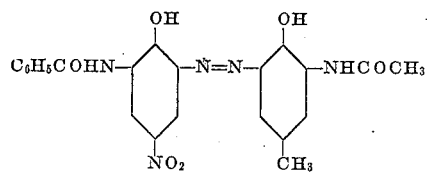
4. The monoazo dyestuff of the formula
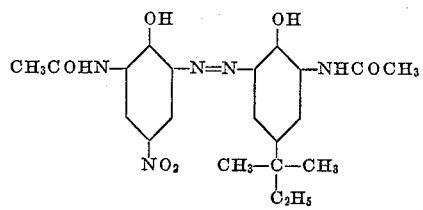
REINHARD NEIER.
WALTER WEHRLI.
REFERENCES CITED
The following references are of record in the file of this patent:
UNITED STATES PATENTS
| Number | Name | Date |
|---|---|---|
| 1,408,363 | Lange | Feb. 28, 1922 |
| 2,229,200 | Wehrli | Jan. 21, 1941 |
FOREIGN PATENTS
| Number | Country | Date |
|---|---|---|
| 198,335 | Switzerland | Sept. 16, 1938 |